Jan. 29, 1935.     H. B. SIEMS     1,989,175
PROCESS FOR PRODUCING SALTS
Filed March 28, 1932
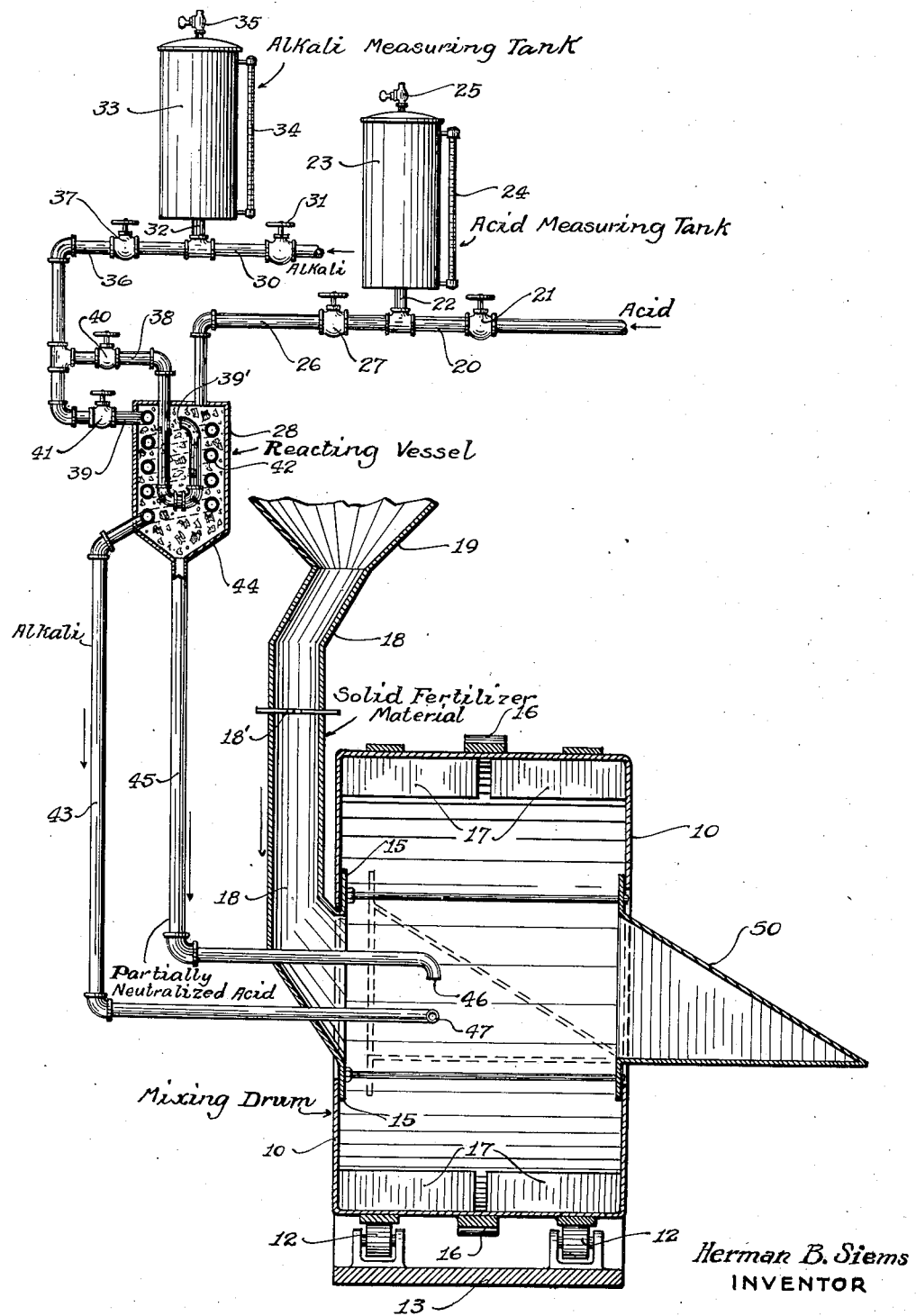
Herman B. Siems
INVENTOR Patented Jan. 29, 1935

1,989,175

UNITED STATES PATENT OFFICE 1,989,175

PROCESS FOR PRODUCING SALTS

Herman B. Siems, Chicago, Ill., assignor, by mesne assignments, to Swift and Company Fertilizer Works, Chicago, Ill., a corporation of Delaware Application March 28, 1932, Serial No. 601,579

6 Claims. (Cl. 23—50)

This invention relates to a novel and improved process for producing certain salts from acids and alkalis, to be used in connection with various chemical treatments.

Accordingly, it is an object of this invention to provide a new and improved process by which a salt is produced as the result of the inter-action of acid and alkaline re-agents which are brought together in a manner to form a spray whereby the re-agents commingle and react to produce the desired salt.

It is a further object of this invention to provide a process for accomplishing the above stated object which involves the use of anhydrous ammonia and a partial neutralizing action between the acid and ammonia and subsequent commingling of the re-agents in the form of a spray, together with the utilization of the heat of neutralization for raising the temperature of the spray to thereby avoid all danger of the liberated ammonia freezing the acid.

A further object of this invention is to provide a process for accomplishing the above stated objects which utilizes the heat of the initial and partial neutralizing reaction for heating the re-agents for the final neutralizing reaction produced by the commingling of the sprayed re-agents. A further object of this invention is to provide a process which provides for the reaction of measured amounts of acid and alkali so that in practice the entire process may be controlled and regulated to produce the exact results desired.

These and other objects not specifically enumerated are contemplated in this invention as will readily appear to one skilled in the art as the following description proceeds. In the description, reference will be made to the accompanying drawing in which the figure is a somewhat diagrammatic elevational view of an apparatus described and claimed in my copending application entitled Mixing apparatus, Serial No. 706,089, filed January 10, 1934, which may be used to carry out this invention and designed particularly for the production of fertilizer.

By referring to the drawing it will be noted that the disclosure includes a mixing drum 10, which may be of any suitable size and construction for use in mixing solid materials such as those commonly employed in fertilizer mixtures. As here illustrated, the drum is of the rotary type mounted on suitable roller bearings 12, carried by the support 13, and the drum may be driven from any suitable source of power (not shown) by means of a pinion in mesh with a ring gear 16, attached to the drum.

The drum is preferably provided with a number of blades 17 on the interior thereof to assist in the mixing operation. The solid material may be fed to the drum through a pipe 18 from any suitable source of supply such as a hopper 19.

Pipe 18 is connected to the non-rotatable part 15, so that the material may be fed to the drum while the drum is rotating. Pipes 43 and 45 may be extended into the central part of the drum substantially as shown in the drawing. Opposite the stationary part 15, and centrally of the drum, a discharge device 50 may be provided having an inclined upper surface. This apparatus is likewise stationarily mounted and while the drum is rotating, is maintained in the full line position shown in the drawing but is adapted to be moved inwardly to the dotted line position for effecting a discharge of the mixture. The material pipe 18 is preferably provided with a valve 18' to prevent the escape of gases before the neutralizing action has been completed.

It is obvious that the neutralizing process and apparatus here referred to may be used in connection with any suitable operation and that the particular construction of the drum here shown is merely for the purpose of illustrating the invention as applied in the manufacture of the fertilizer as is particularly described and claimed in my copending application entitled Fertilizer preparation, Serial No. 706,088, filed January 10, 1934.

The apparatus for providing the salt above referred to will now be described. The pipe 20 having a valve 21 is connected to a source of mineral acid such as sulphuric or phosphoric acids and also by means of pipe 22 to the bottom of the measuring tank 23. The measuring tank is provided with a graduated sight gauge 24, so that by operation of the valve 21, any measured quantity of acid may be introduced into the tank. In feeding the acid to the tank, and during the discharge thereof, the tank is vented to the atmosphere by means of a petcock 25. After securing the desired amount of acid, valve 21 is closed and the acid may thereafter be discharged through pipe 26, having a valve 27 therein which may be open so that the acid will be fed directly into the reacting vessel 28. In the drawing, the vessel is shown in cross section whereby to disclose the interior construction thereof.

In addition, a pipe 30 is provided having a shut-off valve 31 which pipe connects at one end to a suitable source of alkaline reacting substance such as anhydrous ammonia, aqueous ammonia, or any other desired alkali, and at its other end, through pipe 32, to a measuring tank 33, of substantially the construction of the tank 23. This tank also has a sight gauge 34, and an air vent petcock 35. Leading from the pipe 32, is the pipe 36 having a shut off valve 37. This pipe branches to form pipes 38 and 39. Pipe 38 passes downwardly into the mixing vessel 28 and thence upwardly and terminates as at 39' whereby to serve as a discharge for the alkaline substance in the reacting vessel. Pipe 38 is provided with a control valve 40 and a pipe 39 with a control valve 41, so that the exact amount of alkali passing through each pipe may be readily adjusted. It will be further noted that pipe 39 likewise passes into the reacting vessel but instead of opening to the interior thereof, passes therethrough in the form of a coil 42 and thence outwardly and downwardly by means of pipe 43. The bottom of the mixing vessel has inclined walls as at 44 which terminate in a downwardly extending discharge pipe 45. Discharge pipe 45 passes through the end casing 15 of the mixing drum substantially as shown in the drawing and terminates in a discharge nozzle 46. This nozzle is shown as discharging downwardly. Likewise the pipe 43 passes through the walls of the casing 15 and terminates in a discharge nozzle 47 which is arranged in close proximity to the nozzle 46 but preferably at right angles thereto.

In operation, the desired reaction between the acid and the ammonia or other alkali is brought about in the following manner. After the desired measured quantity of acid and alkali have been collected in tanks 23 and 33 respectively, valves 40 and 41 are adjusted to control the quantity of alkali fed through the two branch pipes 38 and 39. Thereafter valves 27 and 37 are opened whereby the acid is permitted to pass into the reacting vessel 28 and the alkali is permitted to pass into the branch pipes 38 and 39.

The portion of the alkali which by way of illustration may be anhydrous ammonia, passing into pipe 38, discharges into the reaction vessel to cause a neutralizing reaction with the acid. The reacting vessel is preferably charged with a suitable filling material such as coke or other similar material which will not be attacked by the acid but will cause the acid to expose considerable surface as it trickles over the particles thereof. Thus in the reacting vessel, the acid enters and is distributed with a large surface exposure throughout the coke mass in the vessel whereby it is brought in reacting contact with the ammonia or other alkali discharging from the outlet 39' of the pipe. This neutralizing reaction is exothermic and accordingly, a considerable amount of heat is liberated in the reacting vessel. The amount of ammonia introduced through valve 40 is regulated in such manner that the ammonia does not completely neutralize the mineral acid whereby no solid phase separates out at the temperature attained in the reaction vessel. Thereafter, the acid in the reacting vessel which has been partially neutralized and the temperature of which has been elevated considerably, is then discharged downwardly through pipe 45 and out through the nozzle 46.

The ammonia fed through pipe 39 passes through the coil 42 in the reacting vessel and thence through pipe 43 to the discharge nozzle 47. By passing the ammonia through the coil 42, heat of neutralization is imparted to the ammonia which not only raises its temperature but causes a larger volume thereof to exist in the gaseous phase. The heat likewise raises the temperature of the partially neutralized acid whereby freezing of the acid during the atomizing action is avoided.

The mixture of acid and dissolved salt which is delivered at 46 is met by a mixture of gaseous and/or liquid ammonia issuing from the nozzle 47. By virtue of the fact that the nozzles are arranged to discharge in different directions and the ammonia gas and/or liquid held under pressure is caused to discharge from the nozzle 47 with considerable velocity, the gaseous and liquid ammonia mixes with the hot acid and dissolved salt issued from the nozzle 46 in such a manner as to produce a fine spray. This spray establishes a commingling of the re-agents within the region of the mixing chamber whereby the desired salt is produced in the manner above described.

In the above illustration which relates to the production of fertilizer, the alkali employed is anhydrous ammonia. As it is usual for anhydrous ammonia to be supplied from a container under pressure so that it will normally exist in liquid form, the ammonia injected from nozzle 47 will have considerable velocity and therefore an atomizing effect upon the acid discharged from nozzle 47. It is the discharge of the ammonia in either gaseous or liquid form or a mixture of both, that is productive of the spray of the re-agents producing the salt.

In the event the process is used with other alkaline re-agents, it is of course understood that the alkali can be discharged under pressure but any suitable means such as supplied by a pump or a gaseous pressure on the liquid. In such case, the alkali will be caused to discharge with considerable force, and thereby produce the desired atomizing effect with the acid.

With anhydrous ammonia, the heat of neutralization developed in the reacting vessel serves to pre-heat both the acid and the ammonia whereby to avoid the danger of the ammonia freezing the acid and clogging the nozzle 46 and otherwise interfering with the process. This precaution is exercised because the refrigerating effect of the discharge ammonia may, in some instances, prevent the successful neutralizing action by freezing the sub-divided particles of acid and thereby clogging the nozzle and preventing neutralization. Anhydrous ammonia which is kept in tanks, exists to a large extent in liquid form and the pre-heating in the coil 42 also serves to assure the existence of a substantial amount of the ammonia in the gaseous phase after passing valve 41, so as to produce the maximum atomizing effect. With ammonia and acid such as sulphuric or phosphoric acids above referred to, in addition to the mechanical atomizing effect of the discharging gas, the action is enhanced by what may be considered the explosive effect of the rapid formation of steam resulting from the neutralizing reaction as expanded by the heat of neutralization. This causes drops of acid to explode and to become atomized and therefore more uniformly distributed.

From the foregoing it will be noted that a novel and improved process is hereby provided which will accomplish all of the above stated objects.

It is to be understood that the invention is not to be limited by the disclosure herein given which is merely by way of illustration as the scope of the invention may be determined from the appended claims.

I claim:

1. The process of producing a chemical compound by the inter-action of an acid and an alkali contained under pressure and exerting a refrigerating effect when released from said pressure, which comprises, partially neutralizing said acid with a portion of said alkali without producing a solid reaction product, and while utilizing heat of neutralization for heating said partially neutralized acid, feeding said heated partially neutralized acid into a reaction space, and causing the remainder of said alkali to forcefully discharge into the path of the heated partially neutralized acid and to form an atomized spray therewith whereby said acid and alkali commingle and complete the neutralizing reaction, in suspension.

2. The process of producing a chemical compound by the inter-action of an acid and an alkali contained under pressure and exerting a refrigerating effect when released from said pressure, which comprises, partially neutralizing said acid with a portion of said alkali without producing a solid reaction product, and while utilizing heat of neutralization for heating said partially neutralized acid and the remainder of said alkali, feeding said heated, partially neutralized acid into a reaction space, and causing the remainder of said heated alkali to forcefully discharge into the path of the heated partially neutralized acid and to form an atomized spray therewith, whereby said acid and alkali commingle and complete the neutralizing reaction, in suspension.

3. The process of producing a chemical compound by the inter-action of an acid and anhydrous ammonia contained under pressure, which comprises, partially neutralizing said acid with a portion of said anhydrous ammonia without producing a solid reaction product and while utilizing heat of neutralization for heating said partially neutralized acid and the remainder of said anhydrous ammonia, feeding said heated, partially neutralized acid into a reaction space and causing the remainder of said heated anhydrous ammonia to forcefully discharged into the path of the heated partially neutralized acid and to form an atomized spray therewith whereby said acid and anhydrous ammonia commingle and complete the neutralizing reaction, in suspension.

4. The process of producing a chemical compound by the inter-action of an acid and an alkali which comprises feeding the acid and a portion of the alkali into a reaction space, partially neutralizing said acid with said portion of said alkali without producing a solid reaction product, feeding said partially neutralized acid into a second reaction space and causing the remainder of said alkali to forcefully discharge into the path of the partially neutralized acid to form an atomized spray whereby said acid and alkali commingle and complete the neutralizing reaction.

5. The process of producing a chemical compound by the inter-action of an acid and an alkali contained under pressure and exerting a refrigerating effect when released from said pressure which comprises partially neutralizing said acid with a portion of said alkali without producing a solid reaction product and while utilizing heat of neutralization for heating said partially neutralized acid, feeding said partially neutralized acid into a reaction space and reacting the remainder of the alkali with said partially neutralized acid in said reaction space.

6. The process of producing a chemical compound by the inter-action of an acid and an alkali contained under pressure and exerting a refrigerating effect when released from said pressure, which comprises partially neutralizing said acid with a portion of said alkali without producing a solid reaction product and while utilizing heat of neutralization for heating said partially neutralized acid, feeding said heated partially neutralized acid into a reaction space and causing the remainder of said alkali to inter-act therewith in a spray whereby said acid and alkali commingle and complete the neutralizing reaction in suspension.

HERMAN B. SIEMS.